United States Patent
Kato et al.

(10) Patent No.: US 8,562,060 B2
(45) Date of Patent: Oct. 22, 2013

(54) VEHICLE SEAT DEVICE

(75) Inventors: Hideyuki Kato, Toyota (JP); Takahiro Sugama, Aichi (JP); Masami Natsume, Nagoya (JP); Tetsuya Abe, Nagoya (JP)

(73) Assignees: Toyota Shatai Kabushiki Kaisha, Aichi (JP); Toyota Boushoku Kabushiki Kaisha, Aichi (JP)

( * ) Notice: Subject to any disclaimer, the term of this patent is extended or adjusted under 35 U.S.C. 154(b) by 337 days.

(21) Appl. No.: 12/516,803

(22) PCT Filed: Sep. 6, 2007

(86) PCT No.: PCT/JP2007/067407
§ 371 (c)(1),
(2), (4) Date: Feb. 3, 2010

(87) PCT Pub. No.: WO2009/031225
PCT Pub. Date: Mar. 12, 2009

(65) Prior Publication Data
US 2012/0139312 A1    Jun. 7, 2012

(51) Int. Cl.
*B60N 2/04*    (2006.01)

(52) U.S. Cl.
USPC ............ 296/65.12; 296/65.09; 297/314; 297/325; 297/330

(58) Field of Classification Search
USPC .......... 296/65.01, 65.05, 65.08, 65.09, 65.11, 296/65.12; 297/14, 315, 325, 330, 331
See application file for complete search history.

(56) References Cited

U.S. PATENT DOCUMENTS

| | | | | |
|---|---|---|---|---|
| 3,811,725 A | * | 5/1974 | Bauer | 296/66 |
| 5,222,775 A | * | 6/1993 | Kato | 292/201 |
| 5,342,103 A | | 8/1994 | Tame et al. | |
| 6,106,066 A | | 8/2000 | Moffa et al. | |
| 6,843,526 B2 | * | 1/2005 | Honda et al. | 297/14 |
| 7,658,430 B2 | * | 2/2010 | Zielinski et al. | 296/65.16 |
| 2005/0269842 A1 | | 12/2005 | Braun | |

FOREIGN PATENT DOCUMENTS

| | | |
|---|---|---|
| JP | 57-185864 U | 11/1982 |
| JP | 64-052949 U | 3/1989 |
| JP | 5-170021 | 7/1993 |
| JP | 06-067162 U | 9/1994 |
| JP | 2004-182089 | 7/2004 |
| JP | 2004-237847 A | 8/2004 |
| JP | 2004-249927 | 9/2004 |
| JP | 2004-306799 A | 11/2004 |
| JP | 2006-137265 | 6/2006 |
| JP | 2007-203757 | 8/2007 |

OTHER PUBLICATIONS

Corresponding JPO Official communication.

* cited by examiner

*Primary Examiner* — Glenn Dayoan
*Assistant Examiner* — Jason S Daniels
(74) *Attorney, Agent, or Firm* — Solaris Intellectual Property Group, PLLC

(57) ABSTRACT

A vehicle seat device in which a seat can be simply and reliably held at a storage position. In a vehicle seat, a vehicle width direction outer side end portion of a seat cushion is supported so as to be capable of rotating around a drive shaft having an axis along a vehicle front-rear direction, and the seat cushion can be switched between a seating configuration at which an occupant can be seated and a storage configuration at which the seat cushion stands erect along a vehicle cabin inner side surface, due to being rotated around the drive shaft by a driving motor. Further, the vehicle seat which is in the storage configuration is held at the storage configuration by a striker.

4 Claims, 16 Drawing Sheets

VEHICLE SEAT DEVICE

TECHNICAL FIELD

The present invention relates to a vehicle seat device which is mounted at a vehicle such as, for example, an automobile or the like, and which can be switched between a seating configuration and a storage configuration by motive power.

RELATED ART

A multi remote-control power seat is known in which storage and a raising/lowering operation of a seat, which is tipped up toward a vehicle side to be stored, is automated (see, for example, Japanese Patent Application Laid-Open (JP-A) No. 5-170021). Further, a side tip-up seat is known which comprises a take-up device that is capable of taking-up and letting-out of a webbing having a hook at a leading end thereof, and in which the seat is tipped up and stored due to the hook being hooked at an assist grip and the take-up device being operated (see, for example, JP-A No. 2004-249927).

DISCLOSURE OF THE INVENTION

Problem to be Solved by the Invention

However, in the former aforementioned technology, the seat at the storage position has a structure in which it is supported, at one width direction end side thereof, by a vehicle body via a tip-up mechanism or the like, and there is room for improvement with respect to supporting of the seat at the storage position. Further, in the latter technology, a manual operation in which the hook is hooked at the assist grip is required when the seat is stored, and there is room for improvement from the standpoint of operability.

In consideration of the aforementioned circumstances, it is an object of the present invention to provide a vehicle seat device in which a seat can be simply and reliably held at a storage position.

Method of Solving the Problem

A vehicle seat device according to a first aspect of the present invention comprises: a seat cushion that is supported so as to be capable of rotating around a rotation shaft having an axis along a vehicle body front-rear direction, at a vehicle width direction outer side end portion thereof, and which can be switched between a seating configuration at which an occupant can be seated and a storage configuration at which the seat cushion stands erect along a vehicle body inner surface, due to rotation around the rotation shaft; driving device which operates to switch between the seating configuration and the storage configuration of the seat cushion; and storage holder which holds the seat cushion with respect to the vehicle body when the seat cushion is switched from the seating configuration to the storage configuration, and which releases the holding state of the seat cushion to the vehicle body when the seat cushion is switched from the storage configuration to the seating configuration.

According to the above aspect, for example, when the seat cushion is switched to the storage configuration from the seating configuration at which seating of an occupant is possible, the driving device is operated. When this is carried out, the seat cushion rotates around the rotation shaft and is switched to the storage configuration at which the seat cushion stands erect along the vehicle body inner surface, due to the motive power of the driving device. Further, for example, when the seat cushion is switched from the storage configuration to the seating configuration, a drive source of the driving device is operated. When this is carried out, the seat cushion rotates around the rotation shaft and is switched to the seating configuration in which it is along a vehicle body floor surface, due to the motive power of the driving device.

Here, in the present vehicle seat device, when the seat cushion reaches the storage position due to the motive power of the driving device, the seat cushion is automatically held with respect to the vehicle body by the storage holder. As a result, since the seat is held to the vehicle body at least the two points of the driving device and the storage holder, change in configuration with respect to the vehicle body and transmission of excessive load to the driving device is suppressed. On the other hand, since the storage holder releases the aforementioned holding state at the time of switching to the seating configuration, switching to a seating state by the driving device is permitted.

In this manner, in the vehicle seat device according to the above aspect, the seat can be simply and reliably held at the storage position. In particular, in a configuration in which the driving device causes drive force to act at the rotation shaft side of the seat cushion, although a supporting load of the driving device at the storage configuration tends to become large, by providing the storage holder, it becomes possible to reduce the supporting load of the driving device. It should be noted that the storage holder may, for example, have a configuration in which the storage holder itself operates automatically, or may have a configuration in which the seat cushion is mechanically locked accompanying movement of the seat cushion due to the motive power of the driving device (including a configuration in which lock release is automated).

In the above aspect, a configuration may be provided wherein the storage holder is configured to cause a holding force toward the vehicle body to act on the seat cushion at a side that is opposite from the rotation shaft side in the width direction of the seat cushion.

According to the above aspect, since the storage holder holds the seat cushion with respect to the vehicle body at a position that is spaced apart from the rotation shaft, displacement of the seat cushion around the rotation shaft can be effectively suppressed. In particular, in a configuration in which the driving device such as described above causes drive force to act at the rotation shaft side of the seat cushion, by providing the present storage holder, it becomes possible to greatly reduce the supporting load of the driving device.

In the respective aspects described above, a configuration may be provided wherein the storage holder is configured to hold the seat cushion in the storage configuration while pushing the seat cushion to the vehicle body side.

According to the above aspect, since the seat cushion which is in the storage configuration is directly or indirectly pushed to the vehicle body, rattling with respect to the vehicle body is effectively suppressed.

In the above aspect, a configuration may be provided wherein the vehicle seat device further comprises a seat back which is connected to the seat cushion so as to be capable of folding up with respect to the seat cushion, and which is positioned between the seat cushion and the vehicle body inner surface in the storage configuration, wherein the storage holder comprises: an engaged portion which is provided at a back surface side of the seat back, an elastic body which is provided at the seat back or the vehicle body inner surface; and a holding mechanism which is provided at the vehicle body, and which carries out holding by pulling the engaged portion to the vehicle body side so that the elastic body is interposed between the seat back and the vehicle body inner surface in an elastically deformed state, while causing an engaging portion to engage with the engaged portion so as to prevent switching of the seat cushion to the seating configuration.

According to the above aspect, in the seating configuration, the seat back is positioned at a rear portion of the seat cushion and configures a back rest. Due to folding up this seat back on the seat cushion, and the driving device causing both the seat cushion and the seat back to stand erect at the vehicle body inner surface side, switching to the storage configuration is carried out. At this time, the holding mechanism causes the engaging portion to engage with the engaged portion provided at the seat back and further operates so as to pull the engaged portion to the vehicle body side. When this is carried out, the elastic body arranged between the seat back and the vehicle body inner surface elastically deforms and is interposed therebetween, and a restoring force of this elastic body acts as a pushing force toward the vehicle body. As a result, the seat cushion and the seat back are reliably held with respect to the vehicle body. Further, since the elastic body is interposed between the vehicle body and the seat (seat back), transmission of vibration to the seat is suppressed, and also, change in configuration of the seat with respect to the vehicle body is absorbed.

In the above aspect, a configuration may be provided wherein an engaged portion supporting mechanism, which causes the engaged portion to project from the seat back and be engagable by the holding mechanism, due to the seat back being folded up with respect to the seat cushion, is provided.

According to the above aspect, when the seat back is folded up with respect to the seat cushion, the engaged portion projects from a side of the seat back that faces the vehicle body inner wall, that is, from the back surface side which is opposite from the back rest. As a result, engagement holding of the engaged portion by the engaging portion of the holder becomes possible. Further, in the seating configuration, since the engaged portion does not project from the seat back, the appearance thereof is fine.

Effect of the Invention

As described above, the vehicle seat device according to the present invention has an excellent effect such that the seat can be simply and reliably held at the storage position.

BEST MODE OF IMPLEMENTING THE INVENTION

A vehicle seat 10 to which a structure of a vehicle seat device according to an exemplary embodiment of the present invention has been applied will be explained based on FIG. 1 through FIG. 9. It should be noted that arrow FR and arrow UP, which are appropriately shown in the respective drawings, respectively indicate a frontward direction (traveling direction) and an upward direction of an automobile to which the vehicle seat 10 has been applied, and that arrow OUT indicates an outer side in a vehicle width direction which corresponds to a seat width direction.

Figure 1:
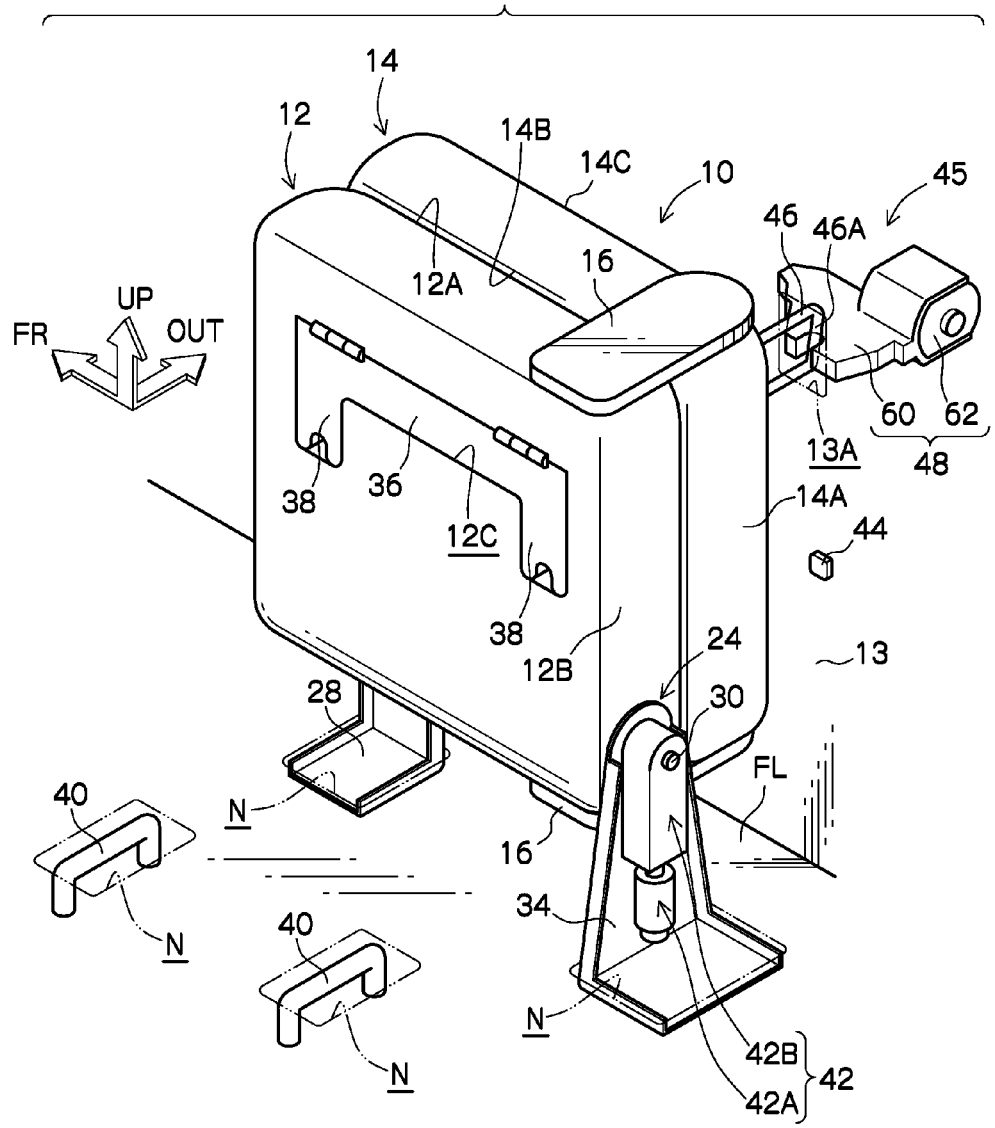
FIG. 1 is a perspective view showing a storage configuration of a vehicle seat according to an exemplary embodiment of the present invention.
Figure 2:
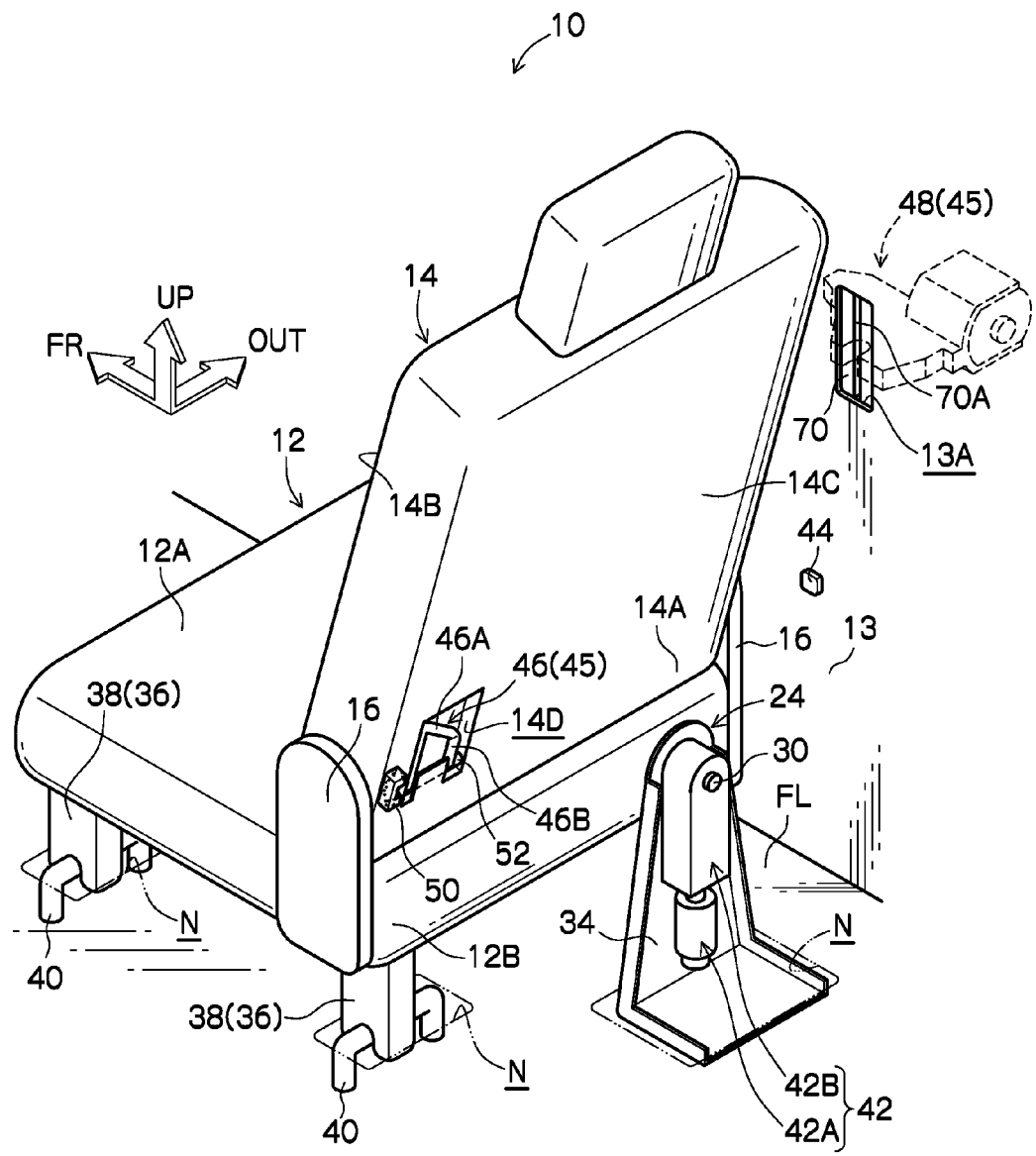
FIG. 2 is a perspective view showing a seating configuration of the vehicle seat according to the exemplary embodiment of the present invention.

In FIG. 1, a schematic overall configuration of the vehicle seat 10 in a storage configuration is shown in perspective view, and in FIG. 2, a schematic overall configuration of the vehicle seat 10 in a seating configuration is shown in perspective view. As shown in these drawings, the vehicle seat 10 comprises a seat cushion 12 for seating of an occupant of the automobile at which the vehicle seat 10 is mounted and a seat back 14 which is connected to a rear end of the seat cushion 12, and which is for supporting an upper body of the seated occupant from behind. This vehicle seat 10 is configured as a third row seat (third seat).

The vehicle seat 10 is configured to be capable of switching between a seating configuration (refer to FIG. 2), at which seating of an occupant is possible due to a seating surface 12A of the seat cushion 12 facing an upper side in a vehicle body up-down direction, and a storage configuration (refer to FIG. 1), at which it is tipped up in a vehicle body side direction and stands erect along a quarter trim 13 forming a vehicle inner side surface. Concrete explanation will be given below.

As shown in FIG. 1 and FIG. 2, a lower end portion 14A of the seat back 14 is connected to a rear end portion 12B of the seat cushion 12 via a reclining device 16, so that the seat back 14 is capable of tilting. The reclining device 16 is configured to be capable of tilting the seat back 14 forward until reaching a state in which the seat back 14 is folded up in a superposed manner with respect to the seat cushion 12, such that a back rest 14B of the seat back 14 is superposed on the seating surface 12A of the seat cushion 12 (hereinafter, referred to as a fold-up state). The reclining device 16 comprises unillustrated biasing device (a power spring), which biases the seat back 14 in a forward-tilting direction with respect to the seat cushion 12, and a locking mechanism, which holds the seat back 14 at an arbitrary tilting position (inclination angle) with respect to the seat cushion 12.

As a result, in the vehicle seat 10, a configuration is provided in which, in a case where no load is applied to the seat back 14 in a lock release state of the locking mechanism, the seat back 14 tilts forward with respect to the seat cushion 12 due to a biasing force of the biasing device and reaches the aforementioned fold-up state. On the other hand, when a rearward load exceeding the aforementioned biasing force is made to act on the seat back 14 in the lock release state, the seat back is configured to tilt rearward with respect to the seat cushion 12.

Figure 4:
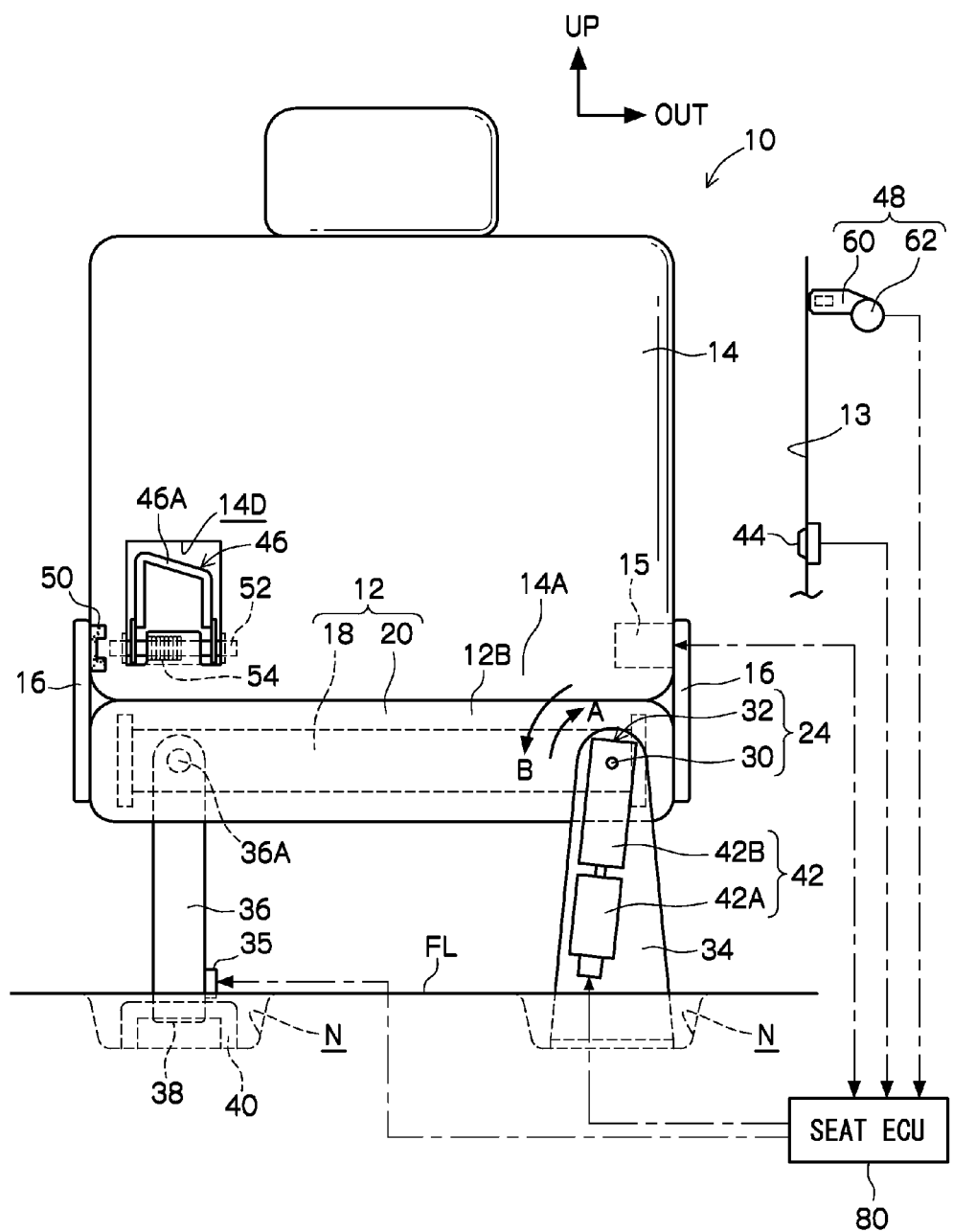
FIG. 4 is a rear view of the vehicle seat according to the exemplary embodiment of the present invention.

Further, in this exemplary embodiment, an electric reclining lock release device 15 is provided as shown in FIG. 4, and a configuration is provided in which a locking state of the reclining device 16 is automatically released due to operation of a switching switch 44 which will be described later. As a result, a configuration is realized in which, when the switching switch 44 is operated in a non-seating state of the vehicle seat 10, the fold-up state in which the seat back 14 is folded up in a superposed manner on the seat cushion 12 is attained. In the electric reclining lock release device 15, a structure can be adopted in which the locking state of the reclining device 16 is released due to, for example, taking up by a motor a wire having one end thereof latched to a reclining release lever of the reclining device 16, by a motor.

Figure 5:
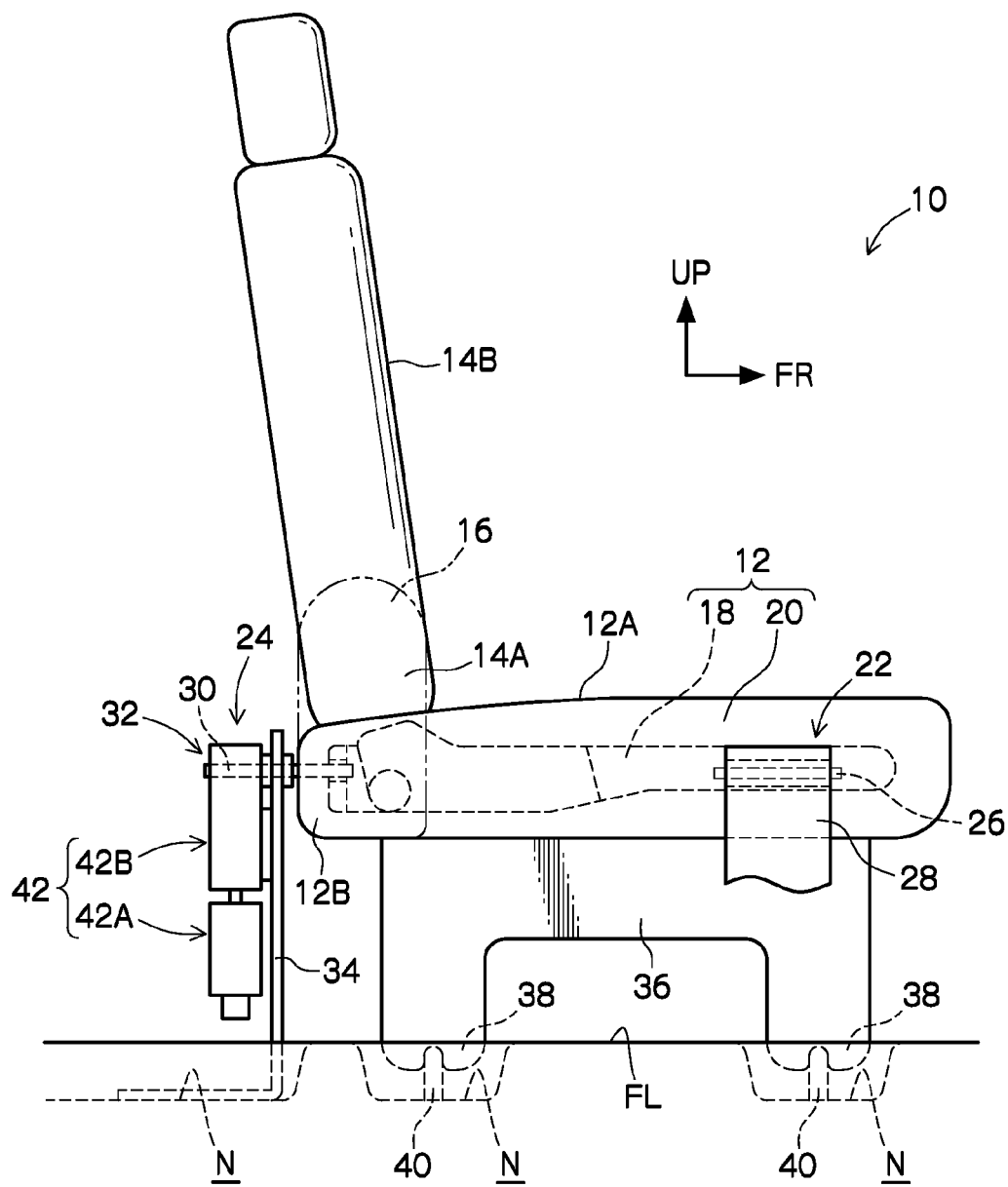
FIG. 5 is a side view seen from a vehicle width direction outer side of the vehicle seat according to the exemplary embodiment of the present invention.

As shown in FIG. 5 and FIG. 4, the seat cushion 12 is configured with a cushion material 20 being provided at a seat cushion frame 18. As shown in FIG. 5, the seat cushion frame 18 is supported so as to be capable of rotating around a shaft along the vehicle body front-rear direction with respect to the vehicle body, via a front hinge 22 and a rear hinge 24 provided at a vehicle width direction outer side portion of the seat cushion frame 18. The front hinge 22 comprises a driven shaft 26, which is arranged longitudinally in the vehicle body front-rear direction and is fixed at the seat cushion frame 18, and a front hinge bracket 28, which supports the driven shaft 26 so as to be capable of rotating around the axis thereof. A lower end portion of the front hinge bracket 28 is fixed at a vehicle body floor FL.

The rear hinge 24 comprises a drive shaft 30, which is arranged longitudinally in the vehicle body front-rear direction and is fixed at the seat cushion frame 18, and a rear hinge bracket 32, which supports the drive shaft 30 so as to be capable of rotating around the axis thereof. The rear hinge bracket 32 is supported at the vehicle body via a base bracket 34 serving as a supporting member, whose lower end is fixed at the vehicle body floor FL. The drive shaft 30 is arranged coaxially with the driven shaft 26, and the seat cushion frame 18 (seat cushion 12) is configured to be capable of switching between the seating configuration and the storage configuration due to being rotated around the axis of the driven shaft 26 and the drive shaft 30.

Further, a support leg 36 is provided at a vehicle width direction inner side, of the seat cushion 18, which is further toward the inner side than a vehicle width direction center portion thereof. The support leg 36 has a pair of front and rear floor lock portions 38, and each floor lock portion 38 has an unillustrated lock member that disengagably engages with a seat anchor 40 fixed at the vehicle body floor FL. Further, each floor lock portion 38 is configured such that the lock member latches (locks) with the seat anchor 40 in the seating configuration of the vehicle seat 10, and switching of the vehicle seat 10 from the seating configuration to the storage configuration is permitted by releasing the latching of the lock member with respect to the floor anchor 40.

In this exemplary embodiment, a configuration is provided in which an electric seat lock release device 35 is provided as shown in FIG. 4, and locking (latching) of the respective floor lock portions 38 by the lock members with respect to the seat anchors 40 is automatically released by operation of the switching switch 44 which will be described later. The lock members are configured so as to be biased in a locking direction by an unillustrated biasing device and so as to be displaced in a lock release direction by pushing movement toward the seat anchors 40, and are configured to mechanically change to a latching (locking) state with respect to the seat anchors 40 accompanying switching from the storage configuration to the seating configuration. That is to say, the electric seat lock release device 35 is configured to displace the lock members to a release position against the biasing force.

It should be noted that the respective seat anchors 40 are respectively buried within concave portions N, which are provided in the vehicle body floor FL (floor panel). As a result, a configuration is provided in which the seat anchors 40 do not project above the vehicle body floor FL in the storage configuration. Further, the lower end portion of the front hinge bracket 28 and the lower end portion of the rear hinge bracket 32 (fastening sites) are also buried within concave portions N. Moreover, the support leg 36 is supported so as to be freely rotatable around a support shaft 36A (refer to FIG. 4) along the vehicle body front-rear direction, with respect to the seat cushion frame 18, and as shown in FIG. 1, is configured to be accommodated in a leg accommodating portion 12C of the seat cushion 12 so as to form a substantially single surface with respect to a vehicle width direction inward-facing surface (lower surface in the seating configuration) of the seat cushion 12, in the storage configuration.

Further, the vehicle seat 10 comprises a driving motor 42 serving as a driving device and drive source for automatically switching between the seating configuration and the storage configuration of the seat cushion 12. The driving motor 42 is configured as a reducer-equipped motor (motor actuator) including a motor portion 42A and a gear portion 42B. In this exemplary embodiment, a gear housing configuring the gear portion 42B also serves as the rear hinge bracket 32 fixed at the base bracket 34, and an output shaft of the gear portion 42B also serves as the drive shaft 30. That is to say, in this exemplary embodiment, the rotation shaft and the output shaft of the present invention are integrated with each other.

According to the foregoing, the driving motor 42 is configured such that the gear portion 42B directly rotationally drives the drive shaft 30 due to the motor portion 42A being operated. It should be noted that the motor portion 42A is arranged at a lower side in the vehicle body up-down direction with respect to the gear portion 42B and at a back surface side of the base bracket 34.

Further, the driving motor 42 is configured to be able to rotate forward and in reverse, and is configured so as to rotate forward to cause the drive shaft 30 (seat cushion frame 18) to rotate in the arrow A direction (refer to FIG. 4), and to rotate in reverse to cause the drive shaft 30 to rotate in the arrow B direction (refer to FIG. 4) which is the reverse direction from the arrow A. As a result, a configuration is provide in which the seat cushion 12 is switched from the seating configuration to the storage configuration due to the driving motor 42 being rotated forward, and the seat cushion 12 is switched from the storage configuration to the seating configuration due to the driving motor 42 being rotated in reverse. Although illustration thereof is omitted, the driving motor 42 (and the base bracket 34) is covered by a cover member.

Moreover, the vehicle seat 10 comprises a storage holding mechanism 45 serving as a storage holder for carrying out holding of the vehicle seat 10 at the vehicle body in the storage configuration. The storage holding mechanism 45 comprises as main components thereof a striker 46 serving as an engaged portion provided at the seat back 14, a seat dragger 48 serving as a holding mechanism provided at the vehicle body, and a stopper rubber 50 serving as an elastic body which is interposed between the quarter trim 13 and the seat back 14 in a state in which the seat dragger 48 engages and holds the striker 46.

As shown in FIG. 1 through FIG. 4, the striker 46 is arranged in the vicinity of a vehicle width direction inner side of a back surface 14C side of the seat back 14 and within an arrangement concave portion 14D which opens in the vicinity of the lower end portion 14A. In this exemplary embodiment, the striker 46 is configured to be able to assume an engaged configuration, in which it projects from the back surface 14C of the seat back 14, and an accommodation configuration in which it is accommodated within the seat back 14.

Specifically, the striker 46 comprises a rod-shaped latched portion 46A which is arranged longitudinally in substantially the vehicle body up-down direction, and a pair of leg portions 46B which extend inward in the vehicle width direction from both longitudinal direction ends of the latched portion 46A, in the engaged configuration in the storage configuration of the vehicle seat 10 shown in FIG. 1. It should be noted that, in this configuration, the striker 46 is formed in a shape in which the latched portion 46A is slightly inclined with respect to the vehicle body up-down direction so that an upper end thereof is positioned further to the vehicle width direction outer side than the lower end thereof. The space between end portions of the pair of leg portions 46B at the opposite sides thereof from the latched portion 46A is bridged in a fixed manner by a support shaft 52 serving as an engaged portion supporting mechanism, and the support shaft 52 is supported by a support bracket fixed to the seat back 14, so as to be able to rotate around its own axis. The striker 46 is configured so as to be able to switch between the aforementioned engaged configuration and the aforementioned accommodation configuration due to this rotation.

Figure 3:
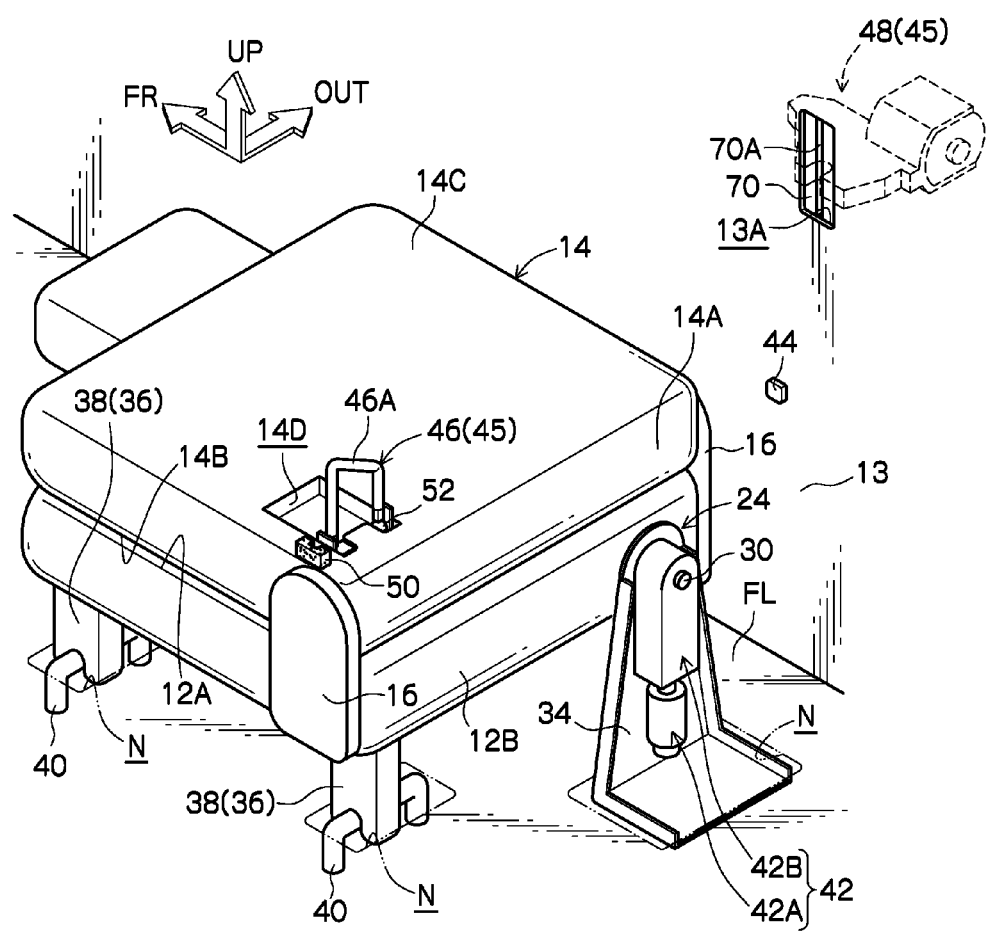
FIG. 3 is a perspective view showing a folded-up state of a seat back of the vehicle seat according to the exemplary embodiment of the present invention.

Further, around the support shaft 52, a torsion coil spring 54 is arranged as a biasing member that biases the striker 46 to the accommodation configuration side, and the striker 46 is configured to be held at the accommodation configuration by the biasing force of this torsion coil spring 54. Furthermore, in the vehicle seat 10, a configuration is provided in which the configuration is switched from the accommodation configuration to the engaged configuration when the seat back 14 is put in the fold-up state with respect to the seat cushion 12 as shown in FIG. 3.

Figure 6:
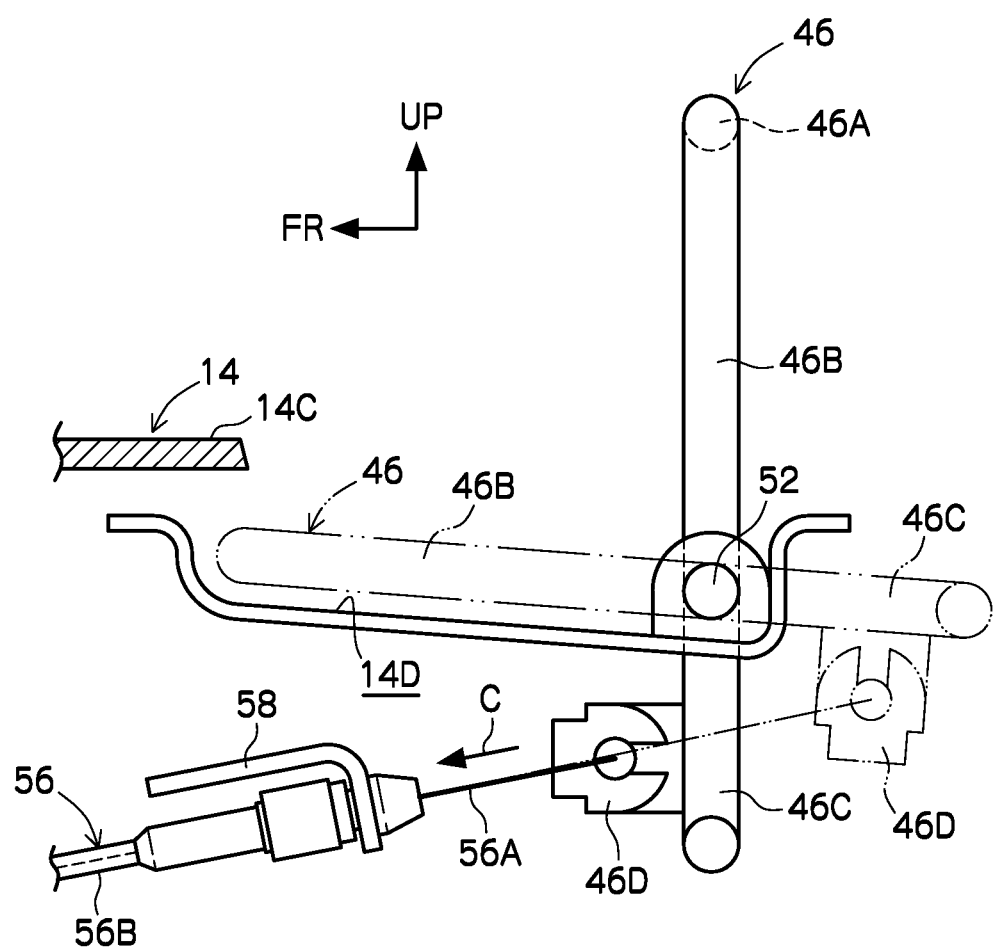
FIG. 6 is a cross-sectional view showing a movement structure, with respect to the seat, of a striker configuring the vehicle seat according to the exemplary embodiment of the present invention.

Specifically, as shown in FIG. 6 which is an enlarged view of the substantial portion of the fold-up state (the state shown in FIG. 3) which is intermediate to the seating configuration and the storage configuration of the vehicle seat 10, the striker 46 comprises an extension portion 46C which is extended to a side that is opposite from the latched portion 46A with the support shaft 52 interposed therebetween, and a wire latching portion 46D is formed at the extension portion 46C. One end portion of a wire 56A configuring a covered wire 56, which one end portion projects from a covering 56B, is latched at this wire latching portion 46D. Further, one end portion of the covering 56B is fixed at (an unillustrated seat back frame which configures) the seat back 14 via a bracket 58. On the other hand, the other end portion of the covering 56B is fixed at the seat back frame in the vicinity of the seat cushion 12 (lower end portion 14A), and the other end portion of the wire 56A is latched at the seat cushion frame 18.

Further, the wire 56A is configured so as to be pulled in an arrow C direction (tension direction) shown in FIG. 6 accompanying a fold-up movement of the seat back 14 with respect to the seat cushion 12. As a result, a configuration is provided in which the striker 46, which is in the accommodation configuration in the seating configuration, switches to the engaged configuration accompanying the fold-up movement of the seat back 14 (i.e., due to operation of the electric reclining lock release device 15) and the engaged configuration is held in the fold-up state.

Figure 7:
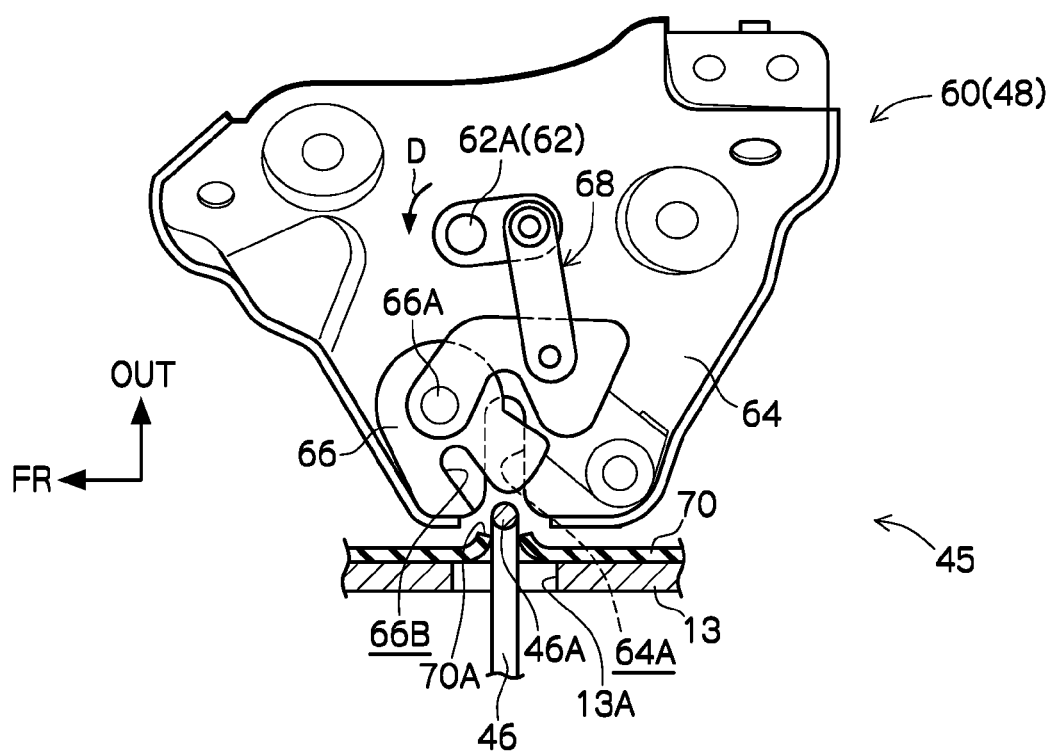
FIG. 7 is a plan view showing a seat dragger configuring the vehicle seat according to the exemplary embodiment of the present invention.

The seat dragger 48 can be configured using, for example, a structure of a publicly known trunk closer, back door closer or the like and, in this exemplary embodiment, comprises a dragger mechanism portion 60 and a dragger motor 62 for operating the dragger mechanism portion 60 as shown in FIG. 1. As shown in FIG. 7, the dragger mechanism portion 60 comprises a support bracket 64 fixed to the vehicle body, and a notch portion 64A which opens inward in the vehicle width direction is formed at the support bracket 64. The notch portion 64A is configured to allow the latched portion 46A of the striker 46 to move therein along the vehicle width direction.

At the support bracket 64, a latch 66 serving as a lock member is supported so as to be freely rotatable around a support shaft 66A. At the latch 66, a notch portion 66B is formed that allows movement of the latched portion 46A, which displaces within the notch portion 64A, while swinging around the support shaft 66A. Further, a crank mechanism 68, which converts and transmits rotation of the dragger motor 62 to swinging of the latch 66, is supported at the support bracket 64. As a result, at the seat dragger 48, a configuration is provided in which, due to the output shaft 62A of the dragger motor 62 rotating in one direction (an arrow D direction shown in FIG. 7), the latch 66 undergoes reciprocating rotation (swinging) and causes an overlap position of the notch portion 66B and the notch portion 64A to be displaced in the longitudinal direction of the notch portion 64A.

Figure 9A:
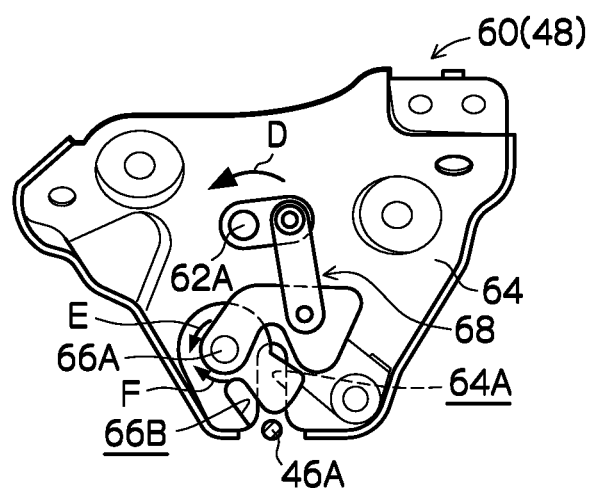
FIG. 9A through FIG. 9H are each operational explanatory views of the seat dragger configuring the vehicle seat according to the exemplary embodiment of the present invention.

The seat dragger 48 described above is configured such that, due to the latched portion 46A of the striker 46 being put into both of the notch portions 64A and 66B, extraction of the latched portion 46A with respect to the notch portion 64A is prevented, and the holding state in which the vehicle seat 10 is held at the vehicle body is attained. More specifically, when the output shaft 62A of the dragger motor 62 is rotationally driven in the arrow D direction in a state in which the latched portion 46A of the striker 46 is positioned at a position where it can be latched by the latch 66 as shown in FIG. 9(A), the latched portion 46A which has been put into the notch portion 66B is pulled in to the inner side of the notch portion 64A, as shown in FIG. 9(B), while the latch 66 rotates in an arrow E direction.

Figure 9B:
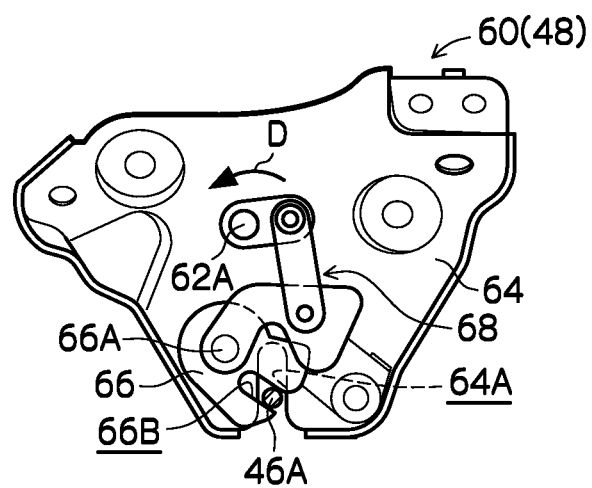
Figure 9C:
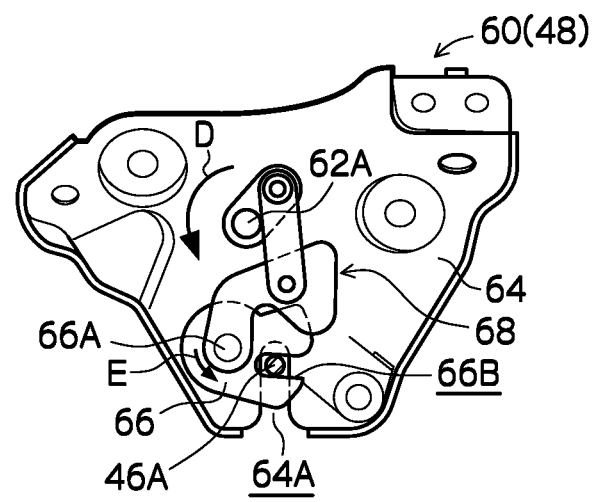
Figure 9D:
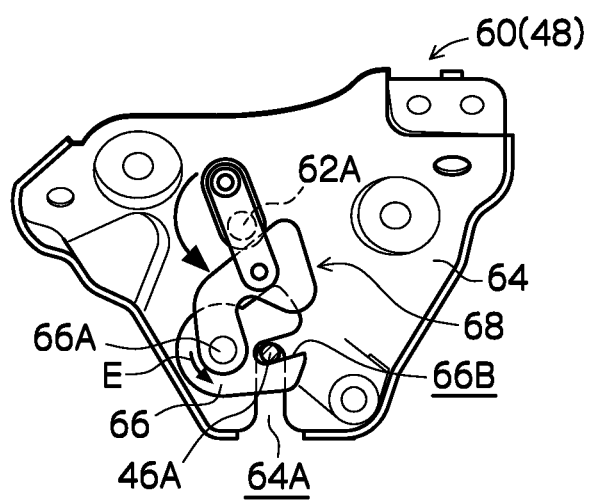

Also a configuration is provided in which, when the latch 66 rotates further in the arrow E direction from a half latch position as shown in FIG. 9(B), a full latch position is reached, where the notch portion 66B is substantially orthogonal to the notch portion 64A as shown in FIG. 9(C), and when the latch 66 rotates further in the arrow E direction from this full latch position, a maximum pull-in position is reached, where the latched portion 46A is positioned in the vicinity of a deepest portion of the notch portion 64A as shown in FIG. 9(D). The latch 66 which has reached this maximum pull-in position is configured to rotate in an arrow F direction, which is the reverse direction from the arrow E, due to the rotation of the dragger motor 62 in the arrow D direction, and a position shown in FIG. 9(E), at which the latched portion 46A has slightly returned to the opening side of the notch portion 64A from the maximum pull-in position due to slight rotation of the latch 66 in the arrow F direction, is set as pull-in movement completion position.

Accordingly, the seat dragger 48 is configured such that, when the vehicle seat 10 changes to the storage configuration due to operation of the switching switch 44, the dragger motor 62 (input portion of the crank mechanism 68) is caused to rotate in the arrow D direction by only an amount which carries out the pull-in movement shown in FIG. 9(A) through FIG. 9(E). It should be noted that an unillustrated reduction mechanism (for example, a worm gear mechanism) is built-in to the dragger motor 62, and that due to self-locking of the reduction mechanism, a configuration is provided in which the latch 66 does not rotate with load input from the striker side.

Figure 9E:
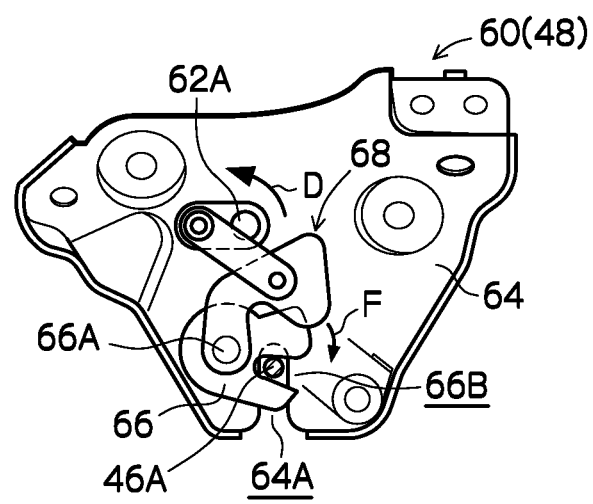
Figure 9F:
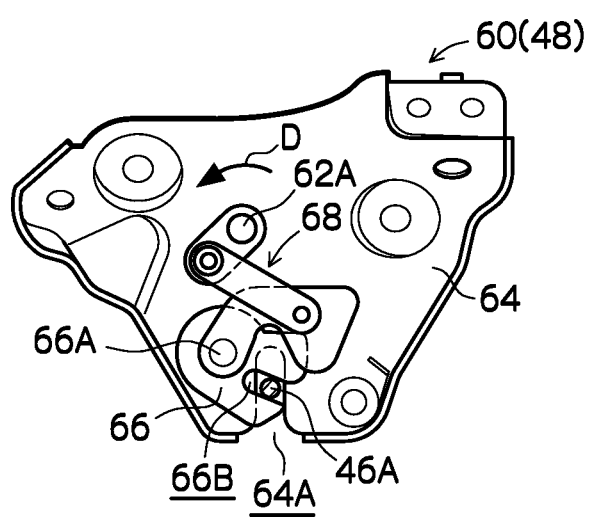
Figure 9G:
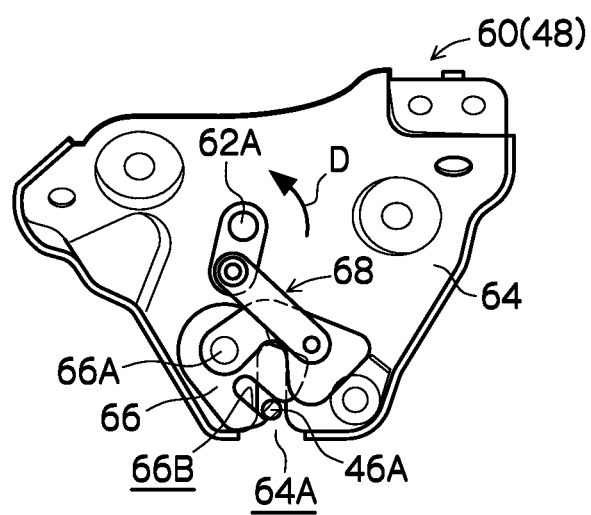
Figure 9H:
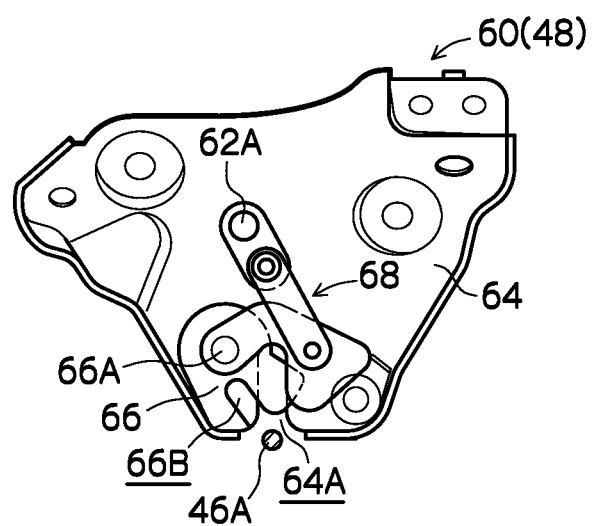

Further, the seat dragger 48 is configured such that, due to the output shaft 62A of the dragger motor 62 being rotated in the arrow D direction from the state in which the latch 66 is positioned at the pull-in movement completion position, the latched portion 46A is pushed out (released) to the notch portion 64A opening side, as shown in FIG. 9(F) and FIG. 9(G), by the latch 66 which rotates in the arrow F direction. Furthermore, a position at which the latched portion 46A is released from the notch portion 66B of the latch 66 as shown in FIG. 9(H) is set as a position at which a seat return waiting position is reached, where rotation movement of the vehicle seat 10 in the arrow B direction due to the driving motor 42 is to be waited for. The seat dragger 48 is configured such that, when the latched portion 46A withdraws from the seat return waiting position (when a latch switch, which will be described later, outputs an OFF signal), the output shaft 62A of the dragger motor 62 is slightly rotated in the arrow D direction and returns to a latch waiting position, where approaching of the latched portion 46A toward the latchable position is awaited, as shown in FIG. 9(A).

Figure 8:
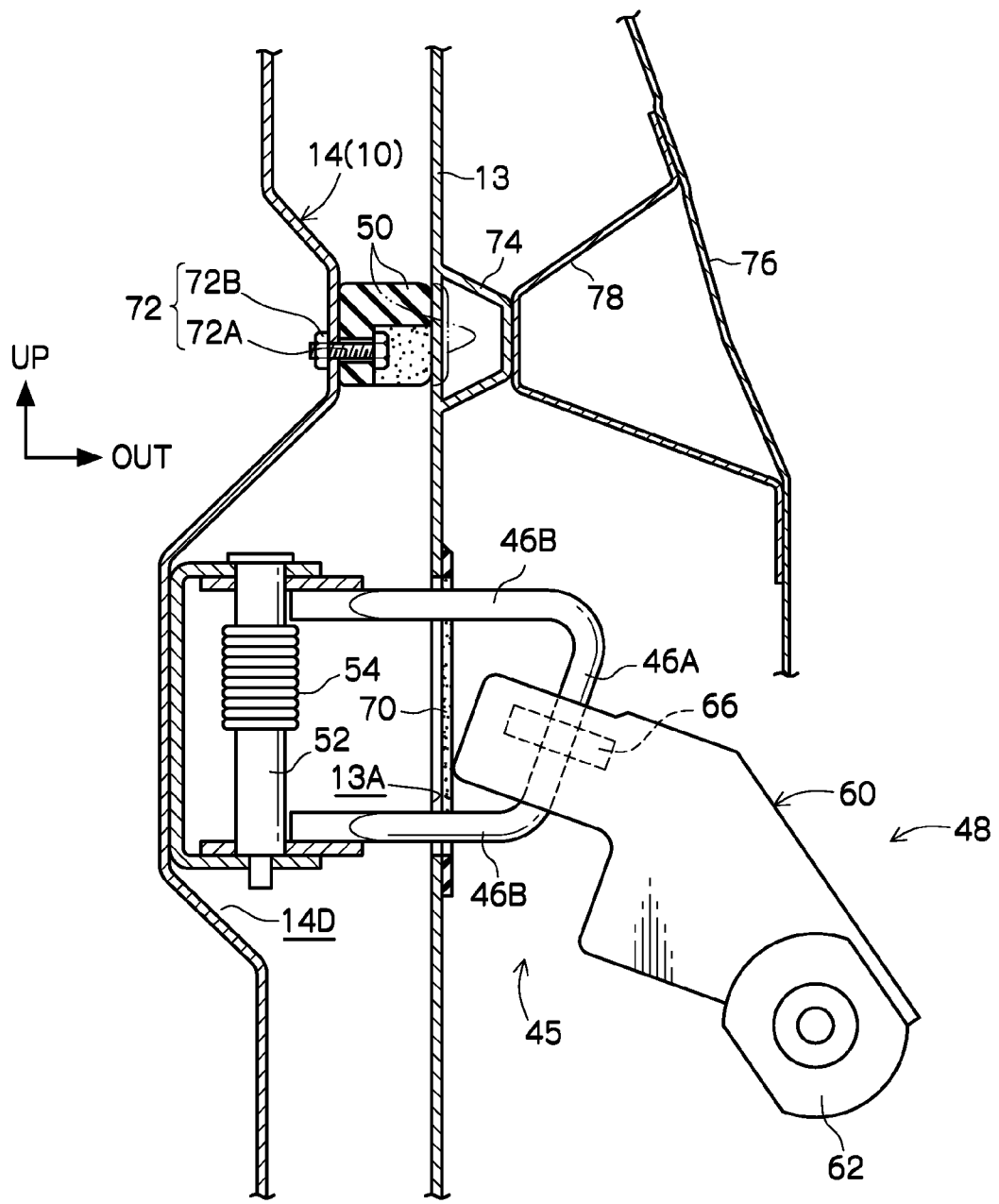
FIG. 8 is a rear cross-sectional view showing a structure around the seat dragger configuring the vehicle seat according to the exemplary embodiment of the present invention.

As shown in FIG. 7 and FIG. 8, the seat dragger 48 described above is accommodated and arranged at an inner side (vehicle width direction outer side) of the quarter trim 13 and is configured so as not to be exposed at the vehicle cabin. For this reason, an opening 13A in order for the latched portion 46A of the striker 46 to access the notch portion 64A of the seat dragger 48 is formed at the quarter trim 13. At an inner surface of the quarter trim 13, a rubber cover 70 is installed so as to close off the opening 13A. At a vehicle body front-rear direction center portion of the rubber cover 70, a slit 70A which is arranged longitudinally in the vehicle body up-down direction is formed, and the latched portion 46A is configured so as to pass through the slit 70A to access the notch portion 64A. An opening width of the slit 70 is made to be smaller than a diameter of the latched portion 46A (substantially half the size thereof), and the latched portion 46A is configured to pass through the slit 70A while causing the rubber cover 70 to deform. That is to say, by closing off the opening 13A with the rubber cover 70 which is easily deformed, reliable latching of the latched portion 46A is realized while setting an opening width of the slit 70A to be small to conceal the seat dragger 48.

As shown in FIG. 2 though FIG. 3, the stopper rubber 50 is fixed in the vicinity of the arrangement concave portion 14D in the back surface 14C of the seat back 14. In this exemplary embodiment, as shown in FIG. 8, the stopper rubber 50 is fixed at the seat back 14 with fastening device 72 comprising a bolt 72A and a nut 72B and projects from the back surface 14C of the seat back 14. This stopper rubber 50 is configured so as to be pressed against the quarter trim 13 accompanying the pull-in movement of the latched portion 46A of the striker 46 due to the seat dragger 48, without contact the quarter trim 13 (vehicle cabin inner side surface) due to rotation of the vehicle seat 10 in the arrow A direction by operation of the driving motor 42 (movement of the latched portion 46A toward the latchable position shown in FIG. 9(A)).

Further, as shown in FIG. 8, in the holding state in which the latched portion 46A is positioned at the aforementioned pull-in movement completion position (refer to FIG. 9(E)), the stopper rubber 50 is configured so as to be interposed between the back surface 14C of the seat back 14 and the quarter trim 13 in a state of being compression deformed with respect to a natural state shown by the imaginary lines. That is to say, a configuration is provided in which the vehicle seat 10 is pressed against (pulled against) the quarter trim 13 by the seat dragger 48 at a load that corresponds to the restoring force of the stopper rubber 50.

In order to support this pressing load, a reinforcement rib 74 is set at a rear surface side (vehicle width direction outer side) of an contact site of the stopper rubber 50 at the quarter trim 13, and further, a support rib 78 which supports the reinforcement rib 74 from the vehicle width direction outer side is set at a body panel (inner panel) 76 configuring a vehicle body rear portion. As a result, a configuration is provided in which deformation of the quarter trim 13 due to pressing of the stopper rubber 50 is suppressed, and a seat holding load based on the compression deformation of the stopper rubber 50 is supported (transmitted to the body panel 76).

Furthermore, in the vehicle seat 10, the driving motor 42, the seat dragger 48 (dragger motor 62), the electric reclining lock release device 15, the electric seat lock release device 35 and the switching switch 44 are each electrically connected to a seat switching ECU 80 serving as a control device. When an operation signal is inputted from the switching switch 44 in a state in which the vehicle seat 10 is in the seating configuration, the seat switching ECU 80 is configured so as to cause the electric reclining lock release device 15, the electric seat lock release device 35, the driving motor 42 and the seat dragger 48 to operate in this order to switch the vehicle seat 10 to the storage configuration. On the other hand, when an operation signal is inputted from the switching switch 44 in a state in which the vehicle seat 10 is in the storage configuration, a control circuit is configured so as to cause the seat dragger 48 and the driving motor 42 to operate in this order.

It should be noted that the control circuit is configured so as to judge whether the configuration of the vehicle seat 10 is the seating configuration or whether it is the storage configuration based on, for example, a lock signal that is inputted from the electric seat lock release device in a case where the lock members of the floor lock portions 38 are latched to the seat anchors 40, or an unlock signal that is inputted from the seat lock release device in a case where the lock members of the floor lock portions 38 are free. Further, an unillustrated latch switch which detects whether or not the striker 46 is positioned at the latch waiting position at which latching is possible is built-in to the seat dragger 48, and when the vehicle seat 10 is switched to the storage configuration, the seat switching ECU 80 is configured to operate the seat dragger 48 on the condition that the latch switch is outputting an ON signal. On the other hand, when the vehicle seat 10 is switched to the seating configuration, the seat switching ECU 80 is configured to carry out driving from the seat return waiting position shown in FIG. 9(H) to the latch waiting position shown in FIG. 9(A) on the condition that the latch switch switches from the ON signal to the OFF signal.

As shown in FIG. 1 through FIG. 3, the switching switch 44 is arranged behind the vehicle seat 10 (seat back 14) at the vehicle cabin inner side surface, and is configured to be able to be operated from a rear gate of the vehicle body (vehicle exterior). It should be noted that, in addition to this switching switch 44 or in place of this switching switch 44, the switching switch 44 may also be provided, for example, in the vicinity of a driver's seat or the like.

The automobile to which the above-described vehicle seat 10 is applied comprises another vehicle seat 10, which is configured substantially symmetrically to the vehicle seat 10 with respect to a vehicle width direction center line of the vehicle body. The vehicle seat 10 and the another vehicle seat 10 are configured so as to be able to be independently switched between the seating configuration and the storage configuration.

Next, operation of the exemplary embodiment will be explained.

In the vehicle seat 10 of the above structure, seating of an occupant is possible in the seating configuration shown in FIG. 2. When this vehicle seat 10 is stored, the switching switch 44 is operated. When this is carried out, the seat switching ECU 80 causes the electric reclining lock release device 15 to operate, and the lock state of the reclining device 16 is released. As a result, the seat back 14 is folded up on the seat cushion 12 due to the biasing force of the biasing device. Accompanying this fold-up movement of the seat back 14, the wire 56A of the covered wire 56 pulls the wire latching portion 46D in the arrow C direction, and the striker 46 is switched from the accommodation configuration to the engaged configuration. Further, the seat switching ECU 80 causes the electric seat lock release device 35 to operate and the lock state of the floor lock portions 38 to the seat anchors 40 is released.

Next, the seat switching ECU 80 outputs a forward rotation command to the driving motor 42. When this is carried out, the driving motor 42, which is supported at the vehicle body floor FL in a fixed manner, rotates forward to rotate the drive shaft 30 in the arrow A direction with respect to the vehicle body. Due to this drive force, the seat cushion 12 rotates in the arrow A direction with respect to the vehicle body, together with the folded up seat back 14, and reaches the storage position as shown in FIG. 1. Accompanying this storage movement, the latched portion 46A of the striker 46 passes through the slit 70A of the rubber cover 70 and reaches the latchable position at which latching by the latch 66 of the seat dragger 48 is possible.

When the latch switch of the seat dragger 48 outputs the ON signal as a result of this, the seat switching ECU 80 rotationally drives the output shaft 62A of the dragger motor 62 in the arrow D direction, and the latched portion 46A is pulled in to the inner side of the notch portion 64A by the latch 66. When the output shaft 62A of the dragger motor 62 is rotated in the arrow D direction until the latch 66 reaches the pull-in movement completion position, the seat switching ECU 80 stops the dragger motor 62. Due to this pull-in movement, the stopper rubber 50 provided at the seat back 14 is interposed between the seat back 14 and the quarter trim 13 in a compression deformation state. Due to the foregoing, the vehicle seat 10 is held in the storage configuration in a state in which it is pulled against the quarter trim 13 (vehicle body) at a load corresponding to the restoring force of the stopper rubber 50, by the storage holding mechanism 45.

On the other hand, when the vehicle seat 10 is switched from the storage configuration to the seating configuration, the switching switch 44 is operated. When this is carried out, the seat switching ECU 80 causes the output shaft of the 62A of the dragger motor 62 of the seat dragger 48 to rotate in the arrow D direction, and causes the latched portion 46A to be pushed out (released) to the opening side of the notch portion 64A. When the latched portion 46A reaches the seat return waiting position shown in FIG. 9(H) (when the latch switch outputs the ON signal), the seat switching ECU 80 outputs a reverse rotation command to the driving motor 42, and the driving motor 42 rotates in reverse to rotate the drive shaft 30 in the arrow A direction. Due to this drive force, the seat cushion 12 rotates in the arrow B direction with respect to the vehicle body, together with the folded up seat back 14, and reaches the seating configuration of the seat cushion 12. Accompanying this movement, the floor lock portions 38 are latched to the seat anchors 40.

Further, since the latched portion 46A withdraws from the latch waiting position accompanying the movement of the vehicle seat 10 in the arrow B direction, the latch switch outputs the OFF signal, and the seat switching ECU 80 causes the output shaft 62A of the dragger motor 62 to rotate in the arrow D direction to cause the latch 66 to return to the latch waiting position. Then, the occupant manually releases locking of the reclining device 16, raises the seat back 14, and is seated at the vehicle seat 10.

Since the driving motor 42 is provided in the vehicle seat 10, the vehicle seat 10 (seat cushion 12) can be automatically switched from the seating configuration to the storage configuration by operation of the switching switch 44. Further, the seat cushion 12 can be automatically switched from the storage configuration to the seating configuration by the driving motor 42. As a result, a vehicle occupant can change a seat arrangement without expending effort.

Further, since the storage holding mechanism 45 is provided in the vehicle seat 10, the striker 46 engages with the seat dragger 48 in the storage configuration, and holding at the vehicle body is reliably carried out. In particular, in the vehicle seat 10, since a structure is provided in which the seat driving mechanism (seating-storage switching mechanism) including the driven shaft 26, the drive shaft 30, and the driving motor 42 supports only the width direction end portion (i.e., the lower end portion in the storage configuration) of the seat cushion 12, a support moment would tend to be insufficient with only support by the driving motor 42, but due to providing the storage holding mechanism 45, the vehicle seat 10 can be reliably held at the storage configuration.

Moreover, in the vehicle seat 10, since the storage holding mechanism 45 causes holding force to act at an upper end side (a position spaced apart from the drive shaft 30) in the storage configuration, the vehicle seat 10 can be held in the storage position against a large moment around the drive shaft 30. As a result, in the vehicle seat 10, the storage configuration is reliably maintained, and also, excessive load is prevented from being inputted at, for example, the driving motor 42 (rear hinge bracket 32).

Further, in the vehicle seat 10, since a pushing (pulling) load toward the vehicle body acts in the storage configuration, rattling with respect to the vehicle body in the storage configuration is effectively suppressed. In particular, since a configuration is provided in which the seat dragger 48 carries out the pull-in movement which pulls in the latched portion 46A of the striker 46, the stopper rubber 50 in the compressed state can be interposed between the vehicle seat 10 in the storage configuration and the quarter trim 13, and the vehicle seat 10 can be reliably held in the storage configuration with a simple structure, by the holding load based on the compression of the stopper rubber 50. Moreover, since the stopper rubber 50 is interposed between the quarter trim 13, which is a vehicle body side member, and the seat back 14, transmission of vibration to the vehicle seat 10 is suppressed, and also, change in configuration of the seat back 14 with respect to the vehicle body is absorbed.

In this manner, in the vehicle seat 10 according to the exemplary embodiment of the present invention, the storage configuration can be simply and reliably held.

Moreover, in the vehicle seat 10, since a structure is provided in which the striker 46 configuring the storage holding mechanism 45 is accommodated with respect to the arrangement concave portion 14D of the seat back 14 in the seating configuration, the striker 46 is accommodated in the arrangement concave portion 14D at the time of use of the vehicle seat 10, and a fine appearance is obtained. Further, since portions projecting from the seat back 14 are reduced, the usability of a space behind the vehicle seat 10 (cargo space) is good.

It should be noted that, in the above exemplary embodiment, although an example has been shown in which the vehicle seat 10 is put in the storage configuration in a state in which the seat back 14 is folded up on the seat cushion 12, the present invention is not limited thereto, and, for example, the vehicle seat 10 may be stored along the quarter trim 13 (vehicle cabin inner side surface) in an expanded state such that the seat back 14 forms a substantially single surface with the seat cushion 12. However, in this case, it is necessary to provide the striker at a side surface or rear surface of the seat cushion (or back), and attention must be paid to the fact that a mechanism which brings about the engaged configuration and the accommodation configuration of the striker becomes complicated. Accordingly, the present invention is also not limited to a configuration in which the striker 46 is provided at the seat back 14.

Further, in the above exemplary embodiment, although an example has been shown in which the driving motor 42 directly rotationally drives the drive shaft 30 in the arrow A or arrow B directions, the present invention is not limited thereto, and, for example a configuration may be provided in which the driving motor 42 drives the seat cushion 12 via a power transmission (conversion) mechanism such as a linkage mechanism or the like. Accordingly, it goes without saying that the present invention is not limited by the arrangement of the driving motor 42 or the like.

The invention claimed is:

1. A vehicle seat device comprising:
a seat cushion that is supported so as to be capable of rotating around a rotation shaft having an axis along a vehicle body front-rear direction, at a vehicle width direction outer side end portion thereof, and which can be switched between a seating configuration at which an occupant can be seated and a storage configuration at which the seat cushion stands erect along a vehicle body inner surface, due to rotation around the rotation shaft;
driving means which operates to switch between the seating configuration and the storage configuration of the seat cushion;
storage holding means which holds the seat cushion with respect to the vehicle body when the seat cushion is switched from the seating configuration to the storage configuration, and which releases the holding state of the seat cushion to the vehicle body when the seat cushion is switched from the storage configuration to the seating configuration; and
a seat back which is connected to the seat cushion so as to be capable of folding up with respect to the seat cushion, and which is positioned between the seat cushion and the vehicle body inner surface in the storage configuration,
wherein the storage holding means comprises:
an engaged portion which is provided at a back surface side of the seat back;
an elastic body which is provided at the seat back or the vehicle body inner surface;
a holding mechanism which is provided at the vehicle body, and which carries out holding by pulling the engaged portion to the vehicle body side so that the elastic body is interposed between the seat back and the vehicle body inner surface in an elastically deformed state and the vehicle seat is pressed against the vehicle body inner surface at a load that corresponds to the restoring force of the elastic body, while causing an engaging portion to engage with the engaged portion so as to prevent switching of the seat cushion to the seating configuration; and
an engaged portion supporting mechanism, which causes the engaged portion to project from the seat back and be engagable by the holding mechanism, due to the seat back being folded up with respect to the seat cushion,
wherein the engaged portion comprises a latched portion and a pair of leg portions, and the engaged portion is configured to be able to assume an engaged configuration, in which it projects from the back surface of the seat back, and an accommodation configuration in which it is accommodated within the seat back, and
wherein, in the storage configuration of the vehicle seat: the engaged portion comprises: (1) the latched portion which is arranged longitudinally in substantially the vehicle body up-down direction, and is inclined with respect to the vehicle body up-down direction so that an upper end thereof is positioned further to the vehicle width direction outer side than the lower end thereof in the engaged configuration in the storage configuration of the vehicle seat, and (2) the pair of leg portions which extend inward in the vehicle width direction from both longitudinal direction ends of the latched portion, and
wherein the engaged portion supporting mechanism causes the engaged portion to switch from the accommodation configuration to the engaged configuration due to the seat back being folded up with respect to the seat cushion.

2. The vehicle seat device of claim 1, wherein the storage holding means is configured to cause a holding force toward the vehicle body to act on the seat cushion at a side that is opposite from the rotation shaft side in the width direction of the seat cushion.

3. The vehicle seat device of claim 1, wherein the storage holding means is configured to hold the seat cushion in the storage configuration while pushing the seat cushion to the vehicle body side.

4. The vehicle seat device of claim 2, wherein the storage holding means is configured to hold the seat cushion in the storage configuration while pushing the seat cushion to the vehicle body side.

* * * * *